(12) United States Patent
Jain et al.

(10) Patent No.: US 10,758,066 B2
(45) Date of Patent: Sep. 1, 2020

(54) METHODS AND A SYSTEM FOR SELF-CHECKOUT PROCESSING

(71) Applicant: NCR Corporation, Duluth, GA (US)

(72) Inventors: Prerit Jain, Kaman (IN); Lyndon Betuin Centinales, Bohol (PH)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/022,984

(22) Filed: Jun. 29, 2018

(65) Prior Publication Data

US 2020/0000248 A1    Jan. 2, 2020

(51) Int. Cl.
| | |
|---|---|
| *G06Q 20/20* | (2012.01) |
| *G06K 9/00* | (2006.01) |
| *A47F 9/04* | (2006.01) |
| *G06K 7/14* | (2006.01) |
| *G06Q 20/32* | (2012.01) |

(52) U.S. Cl.
CPC ............ *A47F 9/048* (2013.01); *G06K 7/1417* (2013.01); *G06K 9/00671* (2013.01); *G06Q 20/208* (2013.01); *G06Q 20/3223* (2013.01)

(58) Field of Classification Search
None
See application file for complete search history.

(56) References Cited

U.S. PATENT DOCUMENTS

| 9,400,805 B2 * | 7/2016 | Knudson | G06K 9/00671 |
|---|---|---|---|
| 10,062,099 B2 * | 8/2018 | McGrath | G06K 9/00771 |
| 2012/0041845 A1 * | 2/2012 | Rothschild | G06Q 20/20 |
| | | | 705/26.81 |
| 2015/0051960 A1 * | 2/2015 | Barbaria | G06Q 30/0215 |
| | | | 705/14.17 |
| 2016/0027091 A1 * | 1/2016 | McGrath | G06Q 30/0633 |
| | | | 705/26.8 |
| 2016/0132891 A1 * | 5/2016 | MacKinnon Keith | G06K 5/00 |
| | | | 705/44 |
| 2016/0162971 A1 * | 6/2016 | Peterson | G06Q 30/0627 |
| | | | 705/26.63 |
| 2019/0244436 A1 * | 8/2019 | Stansell | G06Q 30/0631 |

* cited by examiner

*Primary Examiner* — Christle I Marshall
(74) *Attorney, Agent, or Firm* — Schwegman, Lundberg & Woessner (57) ABSTRACT

An Artificial Intelligence (AI) trained item image identifier identifies item identifiers, item descriptions, item information, and item pricing from item images captured from a mobile self-checkout manager on a mobile device. The item identifiers are automatically placed in a cart. Payment for checkout is processed through the mobile self-checkout manager and a receipt is provided for viewing on the mobile device. The receipt is shown on the display of the mobile device when existing a retail establishment for any auditing of the transaction with the establishment.

17 Claims, 4 Drawing Sheets

METHODS AND A SYSTEM FOR SELF-CHECKOUT PROCESSING

BACKGROUND

Retail checkout, particular grocery store checkout, has a number of inefficiencies. Consumers remove items from the shelves of stores place them in physical shopping carts, remove the items for scanning at a checkout station and place the items in bags, and then remove the items from the bags at home when the items are stored. Each item is handled at least three times.

Consumers are also not enamored with the grocery shopping experience believing it to be a necessary task that just waste their time but cannot be avoided. Retailers have developed a number of efficiencies, such as Self-Service Terminals (SSTs) where consumers scan their own items and pay to checkout without any assistance from a clerk. A few stores have implemented self-scanning while in the aisles but the checkout still requires checkout through a SST within the store before leaving. Furthermore, consumers sometimes struggle with locating barcodes on the items during self-checkouts.

Therefore, what is needed is an improved mechanism for shopping and self-checkout.

SUMMARY

In various embodiments, methods and a system for self-checkout processing are presented.

According to an embodiment, a method for self-checkout processing is presented. Specifically, and in one embodiment, an item image for an item is received and the item image is processed to locate an item identifier. Item information and pricing is retrieved using the item identifier. The item identifier and the item information and pricing is added to a virtual cart for a transaction.

DETAILED DESCRIPTION

Figure 1:
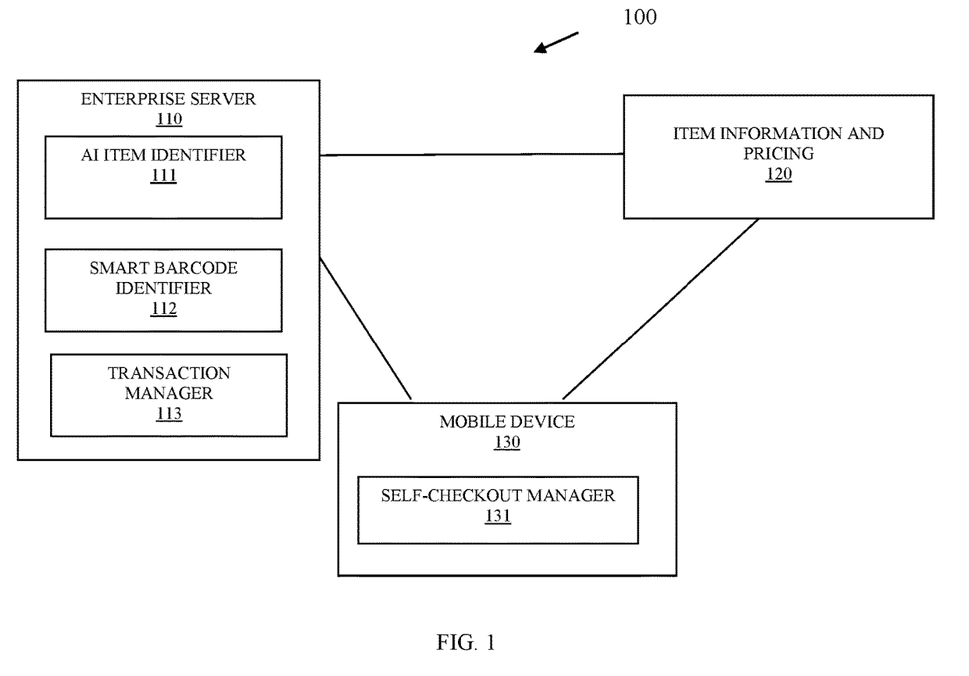
FIG. 1 is a diagram of a system for self-checkout processing, according to an example embodiment.

FIG. 1 is a diagram of a system 100 for self-checkout processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of self-checkout processing, presented herein and below.

The system 100 includes enterprise server having an Artificial Intelligent (AI)-trained item identifier 111, optionally, a smart barcode identifier 112, and a transaction manager 113. The system 100 also includes an item information and pricing data store 120. The system 100 further includes a mobile device 130 having a self-checkout manager 131 mobile application that interfaces with the enterprise server 110 and/or the item information and pricing data store 120 over a wireless connection.

The mobile device 130 can include: phones, tablets, laptops, desktops, wearable processing devices, and the like.

The enterprise server 110 includes a server located or accessible from a local store server of an enterprise. In an embodiment, the enterprise server 110 is a cloud-based server.

The item information and pricing data store 120 may be included on the enterprise server 110 or may be remotely located from the enterprise server 110 and accessible to the AI item identifier 111 and the smart barcode identifier 112.

The AI item identifier 111 is pre-trained on item images for products of the enterprise to recognize features in the images and map the images to specific item identifiers, which can be looked up and located in the item information and pricing data store 120. In an embodiment, the AI item identifier 111 is trained to map features extracted from the item images, score and map those features to item templates that are assigned to specific item identifiers.

In an embodiment, the AI item identifier 111 receives with the item images and sent from the self-checkout manager 131, mobile device 130 location information that is specific to aisles of a store where the mobile device 130 is being operated. The AI item identifier 111 uses the aisle location reported from the mobile device 130, to pre-populate cache of the enterprise sever 110 with the item templates for items known to be located in the store within a given aisle of the store where the mobile device 130 is currently located. This improves the item identification processing throughput and reduces the search space for extracted item features from a given item image to templates for known items in a specific aisle of the store.

The AI item identifier 111 does not require images of and does not rely on item barcode images to resolve and item identifier from an item image. Moreover, the angle taken by a camera of the mobile device 130 when taking the item image using the self-checkout manager 131 is not critical for the AI item identifier 111 to properly assign an item identifier to a particular received item image.

Once the AI item identifier 111 identifies the item identifier for an item image, the item identifier is searched in the item information and pricing data store 120 and an item record is returned that includes item information (description, nutrition details, ingredients, volume details, etc.) and item pricing for the store. The item pricing information is returned by the AI item identifier 111 to the transaction manager 113.

It the item image was a first item image provided from the self-checkout manager 131, then the transaction manager 113 opens a virtual shopping cart and inserts the item description and item price into the virtual shopping cart. An identity of the consumer operating the mobile device 130 is linked to the mobile device identifier for the mobile device 130 (pre-registered to the specific consumer), such that the virtual shopping cart is associated with the identity of the consumer when the virtual shopping cart is created by the transaction manager 113. Additionally, the transaction manager 113 has access to any registered consumer profile that may include pre-registered payment methods (credit card, debit card, gift cards, bank account, in-store credits, etc.).

The self-checkout manager 131 interacts over a wireless network connection with the transaction manager 113 when the consumer opens the mobile application for the self-checkout manager 130 on the mobile device 130. The self-checkout manager 131 includes access to the mobile device's integrated camera and includes a variety of options such as add item to cart, remove item from cart, checkout cart, change registered payment method, and display receipt.

The consumer opens the self-checkout manager 131, a connection is established with the transaction manager 113, the consumer selects add an item to cart, and places the item in any angle or for any side view of the item in the field-of-view of the displayed camera field of view, an image is either automatically taken or the consumer presses a soft key to take the image, the image is sent to the AI item identifier 111, the AI identifier 111 identifies the item identifier and obtains the item information and item pricing, the transaction manager 113 sends the item information and item pricing to the self-checkout manager 131, the self-checkout manager 131 displays a running receipt with an item description and item price in a shopping cart depicted on a display of the mobile device. The consumer can select the item description to immediately receive more detailed information including the item information. The self-checkout manager also displays a running total for the items in the shopping cart on the mobile device 130.

In an embodiment, the self-checkout manager 131 permits the consumer to enter a quantity for a scanned item image and appropriate updates the receipt and the running total based on the quantity amount entered by the consumer.

In an embodiment, and for items that need weighed, situated throughout the store in areas where items need weighed are produce scales. The consumer places the item on the scale and snaps a picture of the item on the scale, the scale displays the item weight, which is then identified from the item image by either the AI item identifier 111 and/or the transaction manager 112.

In an embodiment, the self-checkout manager uses Bluetooth® or Near Field Communication (NFC) through a mobile device tap on the scale to receive the weight information from the scale, which the self-checkout manager 131 reports to the transaction manager 112.

In an embodiment, the mobile device reported location information combined with the image of an item that needs weighed is used to identify the weigh scale and the weight scale reports an item weight to the transaction manager 113. The transaction manager 113 uses the item information and pricing for calculating the item pricing for a given weight of an item and appropriate updates the self-checkout manager 131 with the recorded weight and the price information, which is then reflected in the receipt and running total for the cart.

When the customer is ready to checkout, the customer selects the checkout and pay option presented by the self-checkout manager 131 in the user-facing interface on the display of the mobile device 130. The customer is then asked if the customer wishes to use a registered payment method for expedited payment and checkout or wishes to select a different payment method. If a different payment method is selected, then the appropriate interface screens are presented to the customer to enter the payment information. In an embodiment, the customer uses the camera integrated into the mobile device 130 to snap a picture of the front and/or back of the desired payment card for automated entry of the payment information.

The transaction manager 113 then confirms payment with a payment service and produces a final receipt within the user-facing interface of the self-checkout manager 131 on the display of the mobile device. The receipt may also be additionally sent as a text to the mobile device 130 and/or sent to an email address registered for the customer.

In an embodiment, the self-checkout manager 131 and the transaction manager 113 cooperate to permit the customer to apply coupons to the final transaction price. This can be done by the transaction manager 113 automatically detecting available coupons in a profile associated with the customer or available to the customer based on the items in the customer's virtual cart. This can also be done by the customer using the self-checkout manager's user-facing interface and integrated camera to scan or capture images of printed media coupons.

The customer heads toward an exit of the store and shows a clerk the soft receipt. The clerk briefly inspects the cart and/or bags to audit the transaction and the customer.

In an embodiment, the transaction manager 113 quickly inspects and image taken during a snapshot of an item image to determine whether the image includes features associated with a smart barcode. When the image includes such features, the transaction manager 113 provided the item image to the smart barcode identifier 112 for processing; rather, than providing the item image to the AI identifier 111. This can expedite item recognition and responsiveness to the consumer of the self-checkout manager 131. The smart barcode identifier 112 quickly obtains an item identifier, an item description, and item information (as discussed above) from the image of the smart barcode and returns such information to the transaction manager 113 (all such information is encoded in the smart barcode). The transaction manager 113 quickly obtains item pricing from the item information and pricing data store 120 and returns the item description, item information, and item pricing to the self-checkout manager 131. This can expedite self-checkout manager 131 responsiveness to the customer when the customer inadvertently captures the smart barcode of the item when snapping an image of the item. When the item image lacks the smart barcode, the transaction manager 113 provides the item image to the AI identifier 111 and processing proceeds as discussed above.

In an embodiment, the transaction manager 111 can identify from the item image a variety of different barcode or Quick-Response (QR) data encoding schemes from a quick inspection of the item image and select from a variety of other code reading identifiers that may be different from the smart barcode identifier 112. That is, the transaction manager 111 provides processing to determine how to most efficiently and rapidly identify the item identifier from the item image and requests the appropriate processing application to handle item identifier identification.

In an embodiment, the transaction manager 113 provides an option to the self-checkout manager 131 for presenting and selection within the user-facing interface of the self-checkout manager 131 that allows the customer to specifically request that a barcode be read from the product image by the smart barcode identifier 112. In other words, the customer rather than just randomly grabbing the item and scanning an image can press an option that says scan barcode, which notifies the transaction manager 113 that it is the smart barcode identifier 112 that is to handle the item image for resolving the item identifier. In an embodiment, the transaction manager 113 is configured for recognizing other types of encoded information that is different from that which is typically associated with a barcode but is provided for purposes of providing some information about the item, a manufacturer of the item, tracking information for the item, verification of the item, etc. The transaction manager 113 upon recognizing such information in the item image sends the item image to an appropriate edge-based process that is configured to decode such information and further process such information in some manner.

In an embodiment, the AI item identifier 111 communicates with the self-checkout manager 131 to identify features needed from an item image (pixel locations of item image). The self-checkout manager 131 extracts the features and only sends the features as a smaller and redacted version of the item image. The AI item identifier 111 processes the extracted features and identifies the item identifier, item information, and item pricing in the item information and pricing data store 120. This embodiment can substantially reduce the network bandwidth associated with sending full item images from the mobile device 130 to the transaction manager 113 and/or the AI item identifier 111.

It is also to be noted that a "smart barcode" is different from a traditional barcode in that a smart barcode includes embedded item description and item information (as discussed above) with the item identifier and a traditional barcode includes just the item identifier. This means that in order to obtain an item description and item information from a traditional barcode the data has to be retrieved from a database based on the item identifier. The smart barcode provides processing efficiencies because the item description and item information are encoded and available with the encoded information of the smart barcode, such that no database lookup needs to occur for such data. Furthermore, the smart barcode can be readily distinguished from a traditional barcode based on digits or characters located in a predefined position of the encoded data which distinguish a smart barcode over a traditional barcode.

In an embodiment, the item information and pricing 120 is provided by a network-edge computing device for a cloud-based server that provides the item information and pricing data store 120. That is, an instance of the item information and pricing data store 120 is moved from the cloud-based server to a geographical location proximate to the enterprise server 110 that processes the AI item identifier 111, the smart barcode identifier 112, and the transaction manager 113. This provides increased processing responsiveness from the item information and pricing data store 120. In an embodiment, the AI identifier 111, the smart barcode identifier 112, and/or the transaction manager 113 are provided from a cloud but are prepopulated and made available on one or more network edge devices to be geographically proximate to the physical store where the customer is shopping for purposes of providing increased responsiveness and processing throughput of the system 100.

One now appreciates how consumers can more efficiently shop for items (products) without having to hold or orient an item in any particular manner and without the consumer having to knowingly scan a barcode of the item. A consumer simply grabs an item and sticks in the field of view of the consumer's mobile device camera, if the smart barcode is captured processing can be expedited but if the smart barcode is not captured the item description and item pricing is still returned to the consumer's cart through the AI item identifier 111. Furthermore, the consumer does not have to manually visit a transaction terminal (SST) or Point-Of-Sale (POS) terminal; rather, the soft receipt can be displayed to an attendant by the consumer upon exiting the store.

These and other embodiments are now discussed with reference to the FIGS. 2-4.

Figure 2:
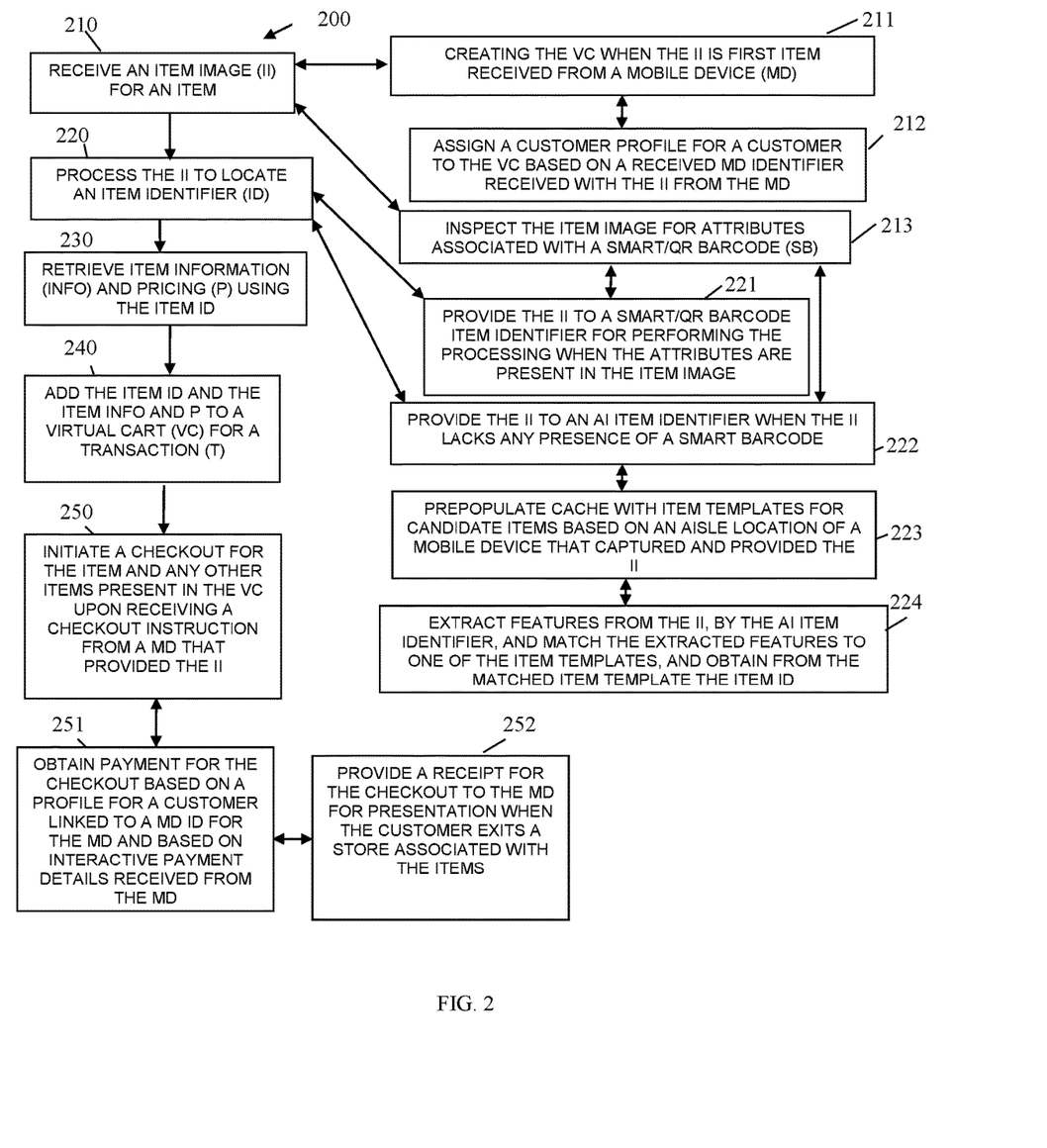
FIG. 2 is a diagram of a method for self-checkout processing, according to an example embodiment.

FIG. 2 is a diagram of a method 200 for self-checkout processing, according to an example embodiment. The software module(s) that implements the method 200 is referred to as a "transaction manager." The transaction manager is implemented as executable instructions programmed and residing within memory and/or a non-transitory computer-readable (processor-readable) storage medium and executed by one or more processors of a device. The processor(s) of the device that executes the transaction manager are specifically configured and programmed to process the transaction manager. The transaction manager has access to one or more network connections during its processing. The network connections can be wired, wireless, or a combination of wired and wireless.

In an embodiment, the device that executes the transaction manager is a server. In an embodiment the server is the enterprise server 110. In an embodiment, the server is a cloud-based server.

In an embodiment, the transaction manager is all of or some combination of the AI item identifier 111, the smart barcode identifier 112, and the transaction manager 113.

The transaction manager interacts over a wireless network connection with instances of the self-checkout manager 131 on mobile devices 130 operated by consumers during shopping in a retail establishment. In an embodiment, the retail establishment is a grocery store.

At 210, the transaction manager receives an item image for an item during an interactive and self-checkout shopping transaction controlled by a customer operating a mobile device.

In an embodiment, at 211, the transaction manager creates a virtual shopping cart when the item image is a first item received from the mobile device of the customer.

In an embodiment of 211, at 212, the transaction manager assigns a customer profile for the customer to the virtual cart based on a received mobile device identifier received with the item image from the mobile device.

In an embodiment, at 213, the transaction manager inspects the item image for attributes associated with a smart barcode or QR code (as described above with the FIG. 1).

At 220, the transaction manager processes the item image to locate an item identifier for the item.

In an embodiment of 213 and 220, at 221, the transaction manager provides the item image to a smart barcode item identifier or QR code item identifier for performing the processing when the attributes are present in the item image. In an embodiment, the smart barcode item identifier is the smart barcode item identifier 112.

In an embodiment of 213 and 220, at 222, the transaction manager provides the item image to an AI item identifier when the item image lacks any presence of a smart barcode. In an embodiment, the AI item identifier is the AI item identifier 111.

In an embodiment of 222, at 223, the transaction manager prepopulates a cache of a server that executes the transaction manager with item templates for candidate items based on an aisle location of a mobile device that captured and provided the item image. That is, the mobile device provides geographical location information and position information with a store so as to identify aisles. The item image templates for all items of the aisle are prepopulated to cache by the transaction manager to reduce the matching a search space when the AI item identifier matches the item image to the item identifier.

In an embodiment of 223, at 224, the transaction manager extract features from the item image, by the AI item identifier, and match the extracted features to one of the item templates, and obtain from the matched item template the item identifier.

At 230, the transaction manager retrieves item information and pricing using the item identifier (such as through lookup of the item identifier in the item information and pricing data store 120).

At 240, the transaction manager adds the item identifier and the item information and pricing to a virtual shopping cart for a self-checkout and shopping transaction with the customer.

At 250, the transaction manager initiates a checkout for the item and any other items present in the virtual cart upon receiving a checkout instruction from the mobile device that provided the item image.

In an embodiment, at 251, the transaction manager obtains payment for the checkout based on a profile for the customer that is linked to the mobile device and based on interactive payment details received from the mobile device.

In an embodiment of 251, at 252, the transaction manager provides a receipt for the checkout to the mobile device for presentation on a display of the mobile device when the customer exits a store associated with the items.

Figure 3:
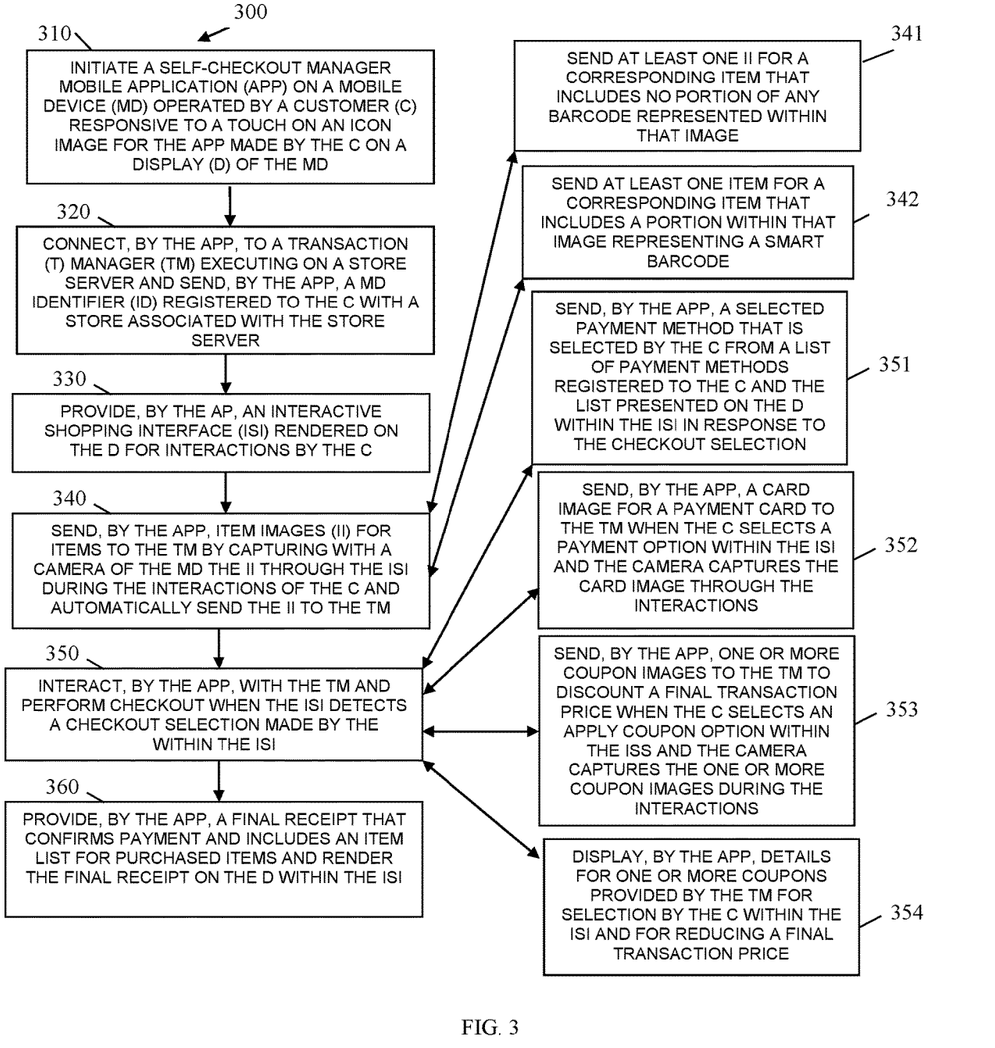
FIG. 3 is a diagram of another method for self-checkout processing, according to an example embodiment.

FIG. 3 is a diagram of another method 300 for self-checkout processing, according to an example embodiment. The software module(s) that implements the method 300 is referred to as a "self-checkout manager." The self-checkout manager is implemented as executable instructions programmed and residing within memory and/or a non-transitory computer-readable (processor-readable) storage medium and executed by one or more processors of a device. The processors that execute the self-checkout manager are specifically configured and programmed to process the self-checkout manager. The self-checkout manager has access to one or more network connections during its processing. The network connections can be wired, wireless, or a combination of wired and wireless.

In an embodiment, the device that executes the self-checkout manager is the mobile device 130. In an embodiment, the mobile device 130 is one of: a phone, a laptop, a tablet, and a wearable processing device.

In an embodiment, the self-checkout manager is the self-checkout manager 131.

The self-checkout manager interacts with the transaction manager 113 and/or the method 200.

At 310, the self-checkout manager, is initiated as a mobile application on a mobile device operated by a customer when a touch on an icon representing the self-checkout manager is made by the customer on a display of the mobile device. The self-checkout manager is the self-checkout manager mobile application illustrated in the FIG. 3 for purposes of the discussion that follows.

At 320, the self-checkout manager connects to a transaction manager executing on a store server, and the self-checkout manager sends a mobile device identifier registered to the customer with a store associated with the store server. In an embodiment, the transaction manager is all or some combination of the transaction manager 113 and/or the method 200.

At 330, the self-checkout manager provides an interactive shopping interface (interface) that is rendered on the display of the mobile device for interactions by the customer.

At 340, the self-checkout manager sends item images for items to the transaction manager by capturing with a camera of the mobile device the item images through the interface during the interactions of the customer, and the self-checkout manager automatically sends the item images to the transaction manager.

In an embodiment, the self-checkout manager uses location-based services to send the physical locations and physical position of the mobile device to the transaction manager. This may be useful for the processing discussed above in the FIG. 2 at 223 and 224 and discussed as an embodiment in the FIG. 1.

In an embodiment, the self-checkout manager receives feature extraction information or pixel location information from the transaction manager and redacts the captured image to the pixels associated with the features and provides the item image as the redacted image. This was also discussed above with the FIG. 1 and can substantially reduce the size of the item images communicated from the mobile device to the transaction manager and thereby improves network bandwidth.

In an embodiment, at 341, the self-checkout manager sends at least one item image for a corresponding item that includes no portion of any barcode represented within that image. The transaction manager 113 sends such item image to the AI item identifier 111 for resolving the item identifier for the item.

In an embodiment, at 342, the self-checkout manager sends at least one item for a corresponding item that includes a portion within that image representing a smart barcode (as defined above with the FIG. 1). The transaction manager 113 sends such an item image to the smart barcode item identifier 112 for resolving the item identifier for the item.

At 350, the self-checkout manager interacts with the transaction manager and performs checkout when the interface detects a checkout selection made within the interface by the customer.

In an embodiment, at 351, the self-checkout manager sends a selected payment method that is selected by the customer from a list of payment methods registered to the customer. The list is presented on the display within the interface in response to the checkout selection and the transaction manager providing the list in response to the checkout selection back to the self-checkout manager.

In an embodiment, at 352, the self-checkout manager sends a card image for a payment card to the transaction manager when the customer selects a payment option within the interface and the camera captures the image through the interactions of the customer.

In an embodiment, at 353, the self-checkout manager sends one or more coupon images to the transaction manager to discount a final transaction price when the customer selects an apply coupon option within the interface and the camera captures the one or more coupon images during the interactions with the customer.

In an embodiment, at 354, the self-checkout manager displays details for one or more coupons provided by the transaction manager for selection by the customer within the interface and for reducing a final transaction price.

At 360, the self-checkout manager provides a final receipt that confirms payment and that includes an item list for purchased items, the final receipt is rendered on the display of the mobile device within the interface. The customer simply shows the display to an attendant when existing the store and the attendant can perform any required audit based on the final receipt and items in the possession of the customer.

Figure 4:
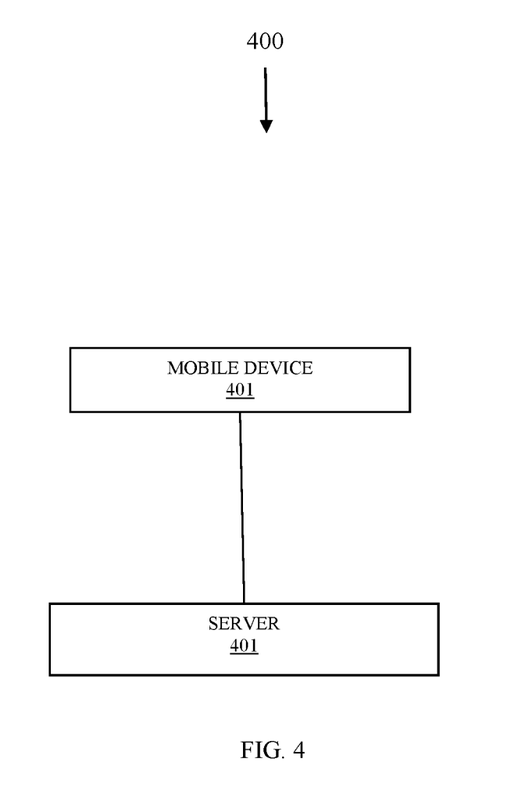
FIG. 4 is a diagram of another system for self-checkout processing, according to an example embodiment.

FIG. 4 is a diagram of a system 400 for self-checkout processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a mobile device 401 and a server 402.

In an embodiment, processing performed by the server 402 is all of or some combination of the processing described above for the AI item identifier 111, the smart barcode identifier 112, the transaction manager 113 and/or the method 200.

In an embodiment, the processing performed by the mobile device 401 is all of or some combination of the processing described above for the self-checkout manager 131 and/the method 300.

In an embodiment, the server 402 is the enterprise server 110 and the mobile device 401 is the mobile device 130.

In an embodiment, the mobile device 401 is one of: a tablet, a phone, a laptop, and a wearable processing device.

In an embodiment, the server 402 is the enterprise server 130. In an embodiment, the server 402 is a cloud-based server.

The server 402 includes at least one hardware processor that is configured to execute executable instructions from a non-transitory computer-readable storage medium, the executable instructions representing the AI item identifier 111, the smart barcode identifier 112, the transaction manager 113, and/or the method 200.

The mobile device 401 includes at least one hardware processor that is configured to execute executable instructions from a non-transitory computer-readable storage medium, the executable instructions representing the self-checkout manager 131 and/or the method 300.

The mobile device 401 is configured to: i) capture item images of items during a self-checkout shopping activity at a store; ii) provide item images to the server 402, iii) display item details and pricing received from the server 402; iv) interact with the server 402 to perform self-checkout for purchased items; and v) display receipt details provided by the server 402.

The server 402 is configured to: i) open a virtual cart for a transaction with the mobile device 401, ii) resolve the item details and pricing from the received item images provided by the mobile device 401, iii) interact with the mobile device 401 to perform the self-checkout, and iv) provide the receipt details upon confirmation of payment to the mobile device 402.

In an embodiment, at least one item image for a corresponding item includes no portion of the image representing a barcode, and wherein at least one other item image for a corresponding item includes a portion of the image representing a smart barcode.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   receiving, by a transaction manager that executes as executable instructions on a processor of a server from a non-transitory computer-readable storage medium, an item image for an item and location information provided by a mobile device, wherein receiving further includes receiving the item image for the item with a weight depicted on sale within the item image when the item is sold by weight;
   matching, by the transaction manager, the location information to an aisle location;
   prepopulating, by the transaction manager, cache with item templates for aisle items known to be located in the aisle location;
   processing, by the transaction manager, the item image to locate an item identifier using the item image and matching features of the item image to a particular item template associated with the item identifier;
   retrieving, by the transaction manager, item information and pricing using the item identifier and using the weight when the item is sold by weight; and
   adding, by the transaction manager, the item identifier and the item information and pricing to a virtual cart for a transaction.

2. The method of claim 1, wherein receiving further creating the virtual cart when the item image is a first item image received from the mobile device.

3. The method of claim 2, wherein creating further includes assigning a customer profile for a customer to the virtual cart based on a received mobile device identifier received with the item image from the mobile device.

4. The method of claim 1, wherein receiving further includes inspecting the item image for attributes associated with a smart barcode or a Quick Response (QR) code.

5. The method of claim 4, wherein processing further includes providing the item image to a smart barcode item identifier or QR code item identifier for performing the processing when the attributes are present in the item image.

6. The method of claim 4, wherein processing further includes providing the item image to an Artificial Intelligence (AI) item identifier when the item image lacks any presence of a smart barcode.

7. The method of claim 4, wherein prepopulating further includes, extracting the features from the item image, by the AI item identifier, and matching the features to one of the item templates, and obtaining from the matched item template the item identifier.

8. The method of claim 1 further comprising, initiating a checkout for the item and any other items present in the virtual cart upon receiving a checkout instruction from the mobile device that provided the item image.

9. The method of claim 8, wherein initiating further includes obtaining payment for the checkout based on a profile for a customer linked to a mobile device identifier for the mobile device or based on interactive payment details received from the mobile device.

10. The method of claim 9, wherein obtaining further includes providing a receipt for the checkout to the mobile device for presentation when the customer exits a store associated with the items.

11. A method, comprising:
- initiating a self-checkout manager mobile application (app) on a mobile device operated by a customer responsive to a touch on an icon image for the app made by the customer on a display of the mobile device;
- connecting, by the app, to a store server and a transaction manager executing on the store server and sending, by the app, a mobile device identifier registered to the customer with a store associated with the store server;
- providing, by the app, an interactive shopping interface (interface) rendered on the display for interactions by the customer;
- sending, by the app, item images for items to the transaction manager by capturing with a camera of the mobile device the item images through the interface during the interactions of the customer and automatically sending the item images to the transaction manager, wherein capturing further includes capturing the item images without regard to barcodes being present or not present within the images and without regard to angles with which the item images are captured by the camera; wherein sending further includes sending at least one of the item images comprising a corresponding item located on a scale, the corresponding item sold based on a weight, and wirelessly obtaining the weight from the scale, and providing the weight with the at least one of the item images to the transaction manager;
- presenting, by the app, item pricing and item descriptions in a running receipt having a running total price within the interface as each item image for each item is captured upon receipt of item pricing and item descriptions from the transaction manager;
- interacting, by the app, with the transaction manager and performing checkout when the interface detects a checkout selection made by the customer within the interface; and
- providing, by the app, a final receipt that confirms payment and includes an item list for purchased items and rendering the final receipt on the display within the interface.

12. The method of claim 11, wherein interacting further includes sending, by the app, a selected payment method that is selected by the customer from a list of payment methods registered to customer and the list presented on the display within the interface in response to the checkout selection.

13. The method of claim 11, wherein interacting further includes, sending by the app, a card image for a payment card to the transaction manager when the customer selects a payment option within the interface and the camera captures the card image through the interactions.

14. The method of claim 11, wherein interacting further includes sending, by the app, one or more coupon images to the transaction manager to discount a final transaction price when the customer selects an apply coupon option within the interface and the camera captures the one or more coupon images during the interactions.

15. The method of claim 11, wherein interacting further includes, displaying by the app, details for one or more coupons provided by the transaction manager for selection by the customer within the interface and for reducing a final transaction price.

16. A system, comprising:

a mobile device; and a server;

wherein the mobile device is configured to: i) capture item images of items during a self-checkout shopping activity at a store, provide at least one item image as a particular image representing the corresponding item on a scale when the corresponding item is sold by weight, wherein a weight of the corresponding item is depicted in the at least one item image; ii) provide item images to the server, iii) display item details and pricing received from the server; iv) interact with the server to perform self-checkout for purchased items; and v) display receipt details provided by the server;

wherein the server is configured to: i) open a virtual cart for a transaction with the mobile device, ii) resolve the item details and pricing from the received item images provided by the mobile device by prepopulating cache with item templates for aisle items based on an aisle location associated with a reported mobile device location when the images are provided to the server and extracting features from the item images, matching the features to particular ones of the item templates and resolving the item details and the pricing, iii) interact with the mobile device to perform the self-checkout, and iv) provide the receipt details upon confirmation of payment to the mobile device.

17. The system of claim 16, wherein at least one item image for a corresponding item includes no portion of the image representing a barcode, and wherein at least one other item image for a corresponding item includes a portion of the image representing a smart barcode.

* * * * *